United States Patent [19]
Love et al.

[11] Patent Number: 5,205,374
[45] Date of Patent: Apr. 27, 1993

[54] SYNTHETIC ENGINE MOUNT STRUT

[75] Inventors: Mickey L. Love; Edward N. Campbell; Douglas Von Massey, all of Oklahoma City, Okla.

[73] Assignee: Dana Corporation, Toledo, Ohio

[21] Appl. No.: 714,604

[22] Filed: Jun. 13, 1991

[51] Int. Cl.$^5$ .............................................. B60K 5/12
[52] U.S. Cl. ................................. 180/300; 248/560; 248/638; 267/64.27; 267/136
[58] Field of Search ................. 180/300, 291, 292; 123/198 E; 267/2, 64.27, 136; 248/560, 638

[56] References Cited

U.S. PATENT DOCUMENTS

| | | | |
|---|---|---|---|
| 2,028,550 | 1/1936 | Lord | 180/292 |
| 3,825,090 | 7/1974 | Runkle et al. | 248/7 |
| 4,518,058 | 5/1985 | Fister et al. | 180/300 |
| 4,676,332 | 6/1987 | Saito | 180/219 |
| 4,685,531 | 8/1987 | Kopich | 180/300 |
| 4,706,946 | 11/1987 | Thorn et al. | 267/292 |
| 4,727,957 | 3/1988 | Fujita | 267/292 |
| 4,779,834 | 10/1988 | Bittner | 180/300 |
| 4,829,953 | 5/1989 | Mertens | 180/300 |
| 4,893,779 | 1/1990 | Bergelt | 248/638 |
| 4,915,365 | 4/1990 | Lee | 180/312 |

FOREIGN PATENT DOCUMENTS

| | | | |
|---|---|---|---|
| 176934 | 4/1986 | European Pat. Off. | 180/300 |
| 733830 | 4/1943 | Fed. Rep. of Germany | 267/292 |
| 743632 | 8/1944 | Fed. Rep. of Germany | 267/292 |
| 3238587 | 5/1984 | Fed. Rep. of Germany | 180/291 |

OTHER PUBLICATIONS

Perry's Chemical Engineers' Handbook, 5th ed., C. 1973, pp. 23-62.

Primary Examiner—Eric D. Culbreth
Attorney, Agent, or Firm—Barnes, Kisselle, Raisch, Choate, Whittemore & Hulbert

[57] ABSTRACT

An engine is attached to a vehicle frame with at least one synthetic engine mount strut mounted generally axially in the principal directions of displacement resulting from engine torque. The strut provides isolation of noise and vibration from the engine and drive train, and reduces engine rotation resulting from the same. A one-piece strut member provides rigid engine-to-frame fixation, while at the same time accommodating small displacement flexing of the structure to isolate and damp high frequency vibration and noise through the use of selected material and structural geometry. The generally one-piece strut, which is pivotally fixed at one end to the engine and at the other end to the frame, can provide for insertion of a bushing surface about each hole provided for pivotal fixation.

15 Claims, 2 Drawing Sheets

SYNTHETIC ENGINE MOUNT STRUT

This invention relates to improved engine torque-resisting strut assemblies that dampen vibration and decrease transmission of noise and vibration. More particularly, this invention relates to an improved strut assembly for securing an engine to a vehicle frame, the assembly being comprised of a one-piece body of synthetic material composition, and having a defined geometric periphery with an open center and integral braces.

BACKGROUND AND OBJECTS OF THE INVENTION

One previously known way for securing an engine to a vehicle frame, while providing decreased transmission of noise and vibration and restraint of engine torque reactions, is to utilize a torque strut with hydraulic piston action to dampen the engine torque reactions. The torque strut is pivotally attached to the engine axially in the direction of greatest torque reaction, with the opposite end pivotally attached to the vehicle frame, and with flow control means in the strut to regulate transfer of hydraulic fluids to either side of the piston as the strut is subjected to engine torque loads. An apparatus for resisting engine torque reactions is disclosed in U.S. Pat. No. 4,518,058.

U.S. Pat. No. 4,706,946 discloses a mechanical connecting link or strut that accommodates limited motion due to normal engine oscillations and restrains excessive engine motion as results from engine torque. The dampening is achieved through a mechanical apparatus utilizing sliding plates and friction elements which are compressed between the plates.

U.S. Pat. No. 4,779,834 discloses an alternative way of providing a torque strut arrangement to limit engine roll, while providing dampening of vibration. This engine displacement limiter utilizes a three-point torque strut to resist the rolling action of an engine from reactive torque thereon, and utilizes rubber bushings at the three attachment points to provide isolation of the engine to frame.

Although these torque-resisting struts are able to provide isolation of small displacement vibrations between the engine and the vehicle frame, and resistance of large displacement engine torque to prevent large rotational displacement of the engine, especially under rapid throttling and acceleration of the engine and vehicle, they also possess a number of significant disadvantages and require many subassembly components in their construction. Over extended periods of use, the components wear and age as both the hydraulic piston strut and rigid strut with rubber bushings are subjected to vibration and thermal cyclic loading. In use, the tearing of rubber bushings on rigid engine struts is a problem that is difficult to prevent. As with any complex mechanical apparatus, the hydraulic piston strut utilizes many mechanical components with interacting frictional interfaces, thereby leading to wear of individual components and eventual leakage of hydraulic fluid. Likewise, the torque-resisting strut utilizes a complimentary pair of elongate slidable plates with frictional elements which will be subjected to the long term effects of component wear.

SUMMARY OF THE INVENTION

Pursuant to this invention, an engine is attached to a vehicle frame with at least one synthetic engine mount strut mounted generally axially in the principal directions of displacement resulting from engine torque. The strut provides isolation of noise and vibration from the engine and drive train, and reduces engine rotation resulting from the same. It has been discovered that a generally one-piece strut member can provide relatively rigid engine-to-frame fixation, while at the same time accommodating small displacement flexing of the structure to isolate and damp high frequency vibration and noise through a synergistic combination of selected material and structural geometry. The generally one-piece strut, which is pivotally fixed at one end to the engine and at the other end to the frame, can provide for accommodation of a bushing surface about each hole provided for pivotal fixation.

In order for the strut to provide both structural resistance to engine motion in the car frame and reduction of transmissibility of noise and vibration between the same, a material is used that provides structural flexing and dampening characteristics. The structural geometry of the strut allows small scale flexing of the structural elements, while preventing large scale deformation and structural collapse. To achieve these structural requirements, this invention utilizes a closed loop member having an open center with at least one integral brace extending through the open center between associated elements of the body of the structure. Preferably, the geometric ring is a parallelogram. The brace, which preferably extends generally laterally of the mounting means, is of a non-linear geometric construction. This provides for a controlled hoop-type deformation of the outer perimeter of the closed loop member, as the generally non-linear brace flexes when subjected to small displacement high-frequency deformations of the closed loop member forming the generally hoop shaped structural perimeter.

To provide the required material characteristics such as improved vibration and noise dampening, extended unit life, resistance to environment and aging, a reduced compression set, and generally light weight, a generally vigorous synthetic material is utilized to construct the body of the strut. Preferably, the strut is molded in one-piece, with provision for accommodating bushings about the pivotal attachment points. The synthetic strut is unique in that it is not of a steel or metallic construction, and it does not require the use of a multiple-component mechanism to absorb the high frequency and small displacement vibrations and resulting noise. This invention obtains the same or improved results by utilizing the inherent characteristics of both the material and the novel structural geometric configuration.

To greatly improve the characteristics of the strut to large deformation motions of the engine relative to the frame resulting from drive-line and engine torque, and absorption with a decreased transmissibility of generally high frequency and small displacement noise and vibration, the dimensions and geometry of the elements of the closed loop member and the lateral brace can be tuned for a specific set of material properties to achieve the appropriate system vibration and stiffness characteristics that meet the given loading and vibration characteristics of a specific engine and frame configuration. Alternatively, the synthetic strut may be molded from a plastic with a filler material incorporating reinforcing materials or fibers therein. In addition, the lateral bracing of the closed loop member may be accomplished with multiple braces extending either longitudinally or laterally, with each of them providing functionally similar resistance to the hoop like deformation of the closed loop member, thereby slightly flexing the braces as the closed loop member is subjected to generally high frequency small displacement deformations and loads.

Objects, features and advantages of this invention are to provide a strut assembly for securing an engine to a vehicle frame, whereby the strut acts to constrain engine and drive-line motion resulting from engine throttling and engine torque, and also provides dampening of engine and drive-line noise and vibration, where the strut is constructed from a synthetic material in a generally one-piece configuration, while still providing material and geometric dampening characteristics and providing rigid resistance to large displacement motion resulting from engine torque. These characteristics of the strut can be readily and easily adjusted to match the vibration and engine torque between any given engine and frame configuration. Use of multiple strut assemblies can function the same for an engine configuration of any orientation in three dimensions, which is creating vibration and engine torque tending to induce any combination of engine pitch, yaw and roll. The utilization of any number of these strut assemblies, in combination with traditional engine mounts, such as disclosed in U.S. Pat. No. 4,915,365, provides an engine mount system that isolates the engine and drive-line vibration from the vehicle frame assembly and restricts engine torque induced motion, thereby reducing the transmissibility of noise and vibration. The simple generally one-piece configuration of the strut assembly provides an economical, functional, tunable and light-weight structure of economical manufacture and assembly, and requires little service and maintenance.

BRIEF DESCRIPTION OF THE DRAWINGS

These and other objects, features and advantages of this invention will be apparent from the following detailed description, appended claims and accompanying drawings in which:

DETAILED DESCRIPTION OF PREFERRED EMBODIMENTS

Figure 1:
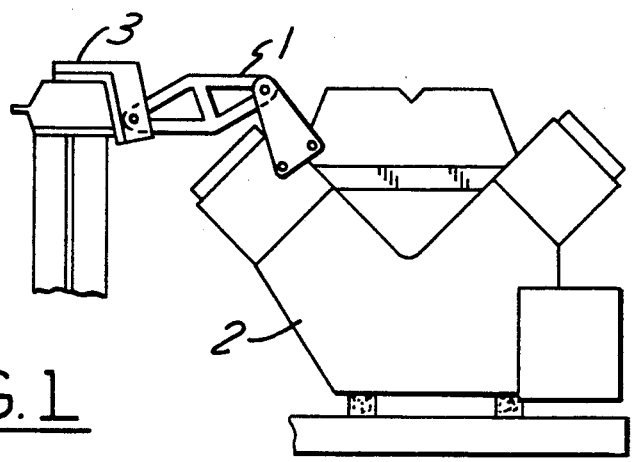
FIG. 1 is a side view of a motor vehicle engine and transaxle installation in a vehicle frame having a synthetic engine mount strut according to the present invention.

Referring in more detail to the drawings, FIG. 1 is a side view of a motor vehicle engine and transaxle installation having a synthetic engine mount strut 1 of this invention, securing the engine 2 to the vehicle frame 3. Opposed ends of the strut are connected by suitable fasteners to the engine and frame respectively. Preferably, the strut is attached by bolts passing through bushings positioned in holes in the opposed ends of the body of the strut. The fasteners thereby provide a pivotal fixation between the strut and engine, and the strut and frame, such that the forces exerted on the strut are primarily axial loads between the fasteners.

Figure 2:
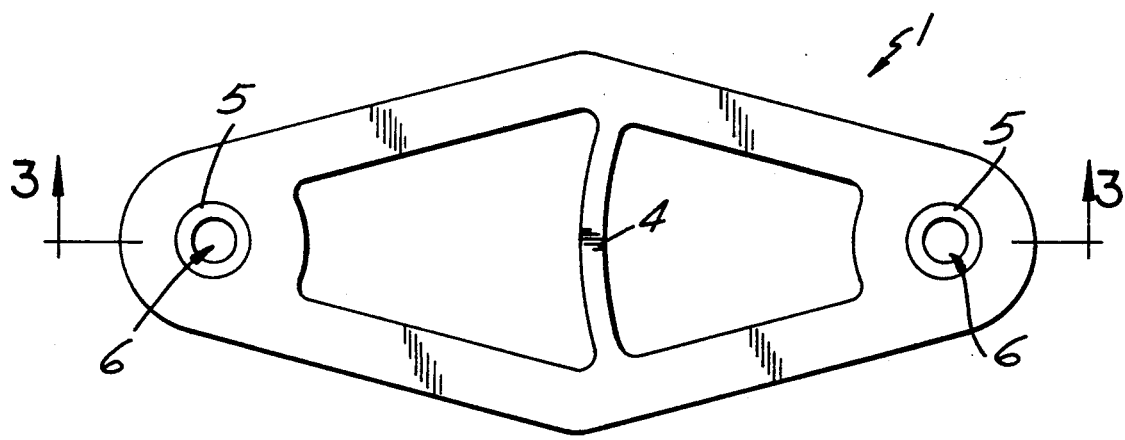
FIG. 2 is a side view of the strut of FIG. 1.
Figure 3:
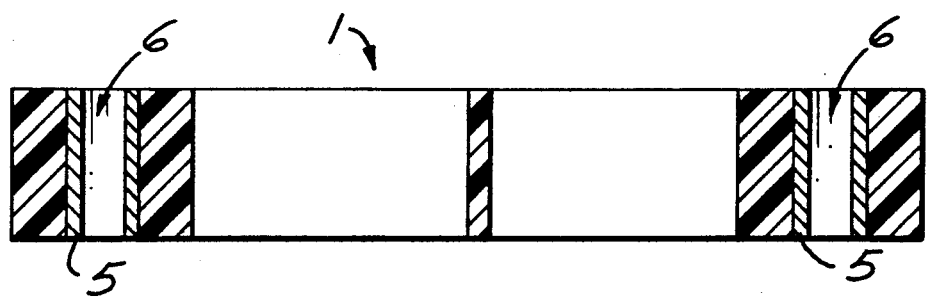
FIG. 3 is a view taken along the line 3—3 in FIG. 2.

In accordance with a preferred embodiment of this invention, the strut assembly has a parallelogram shaped body with an open center, and at least one integral non-linear geometric brace extending through the open center between opposed corners of the body of the strut assembly. The elements forming the body are generally ⅜" in depth (see FIG. 3) and ⅜" in width. Opposite ends of the strut assembly have holes 6 that receive respective bushings 5 through which fasteners pass in order to attach the strut assembly to the engine and frame. Preferably, the bushings are made of heat treated steel with a 7/16" inner diameter, ⅝" outer diameter and ½" depth. The bushings can be pre-positioned and molded into the strut during manufacture, or assembled into their respective holes after manufacture of the strut. Alternatively, composite reinforcement material such as graphite or carbon fiber weave can be locally positioned to create a bushing surface within the strut assembly. FIG. 3 is a sectional view along line 3—3 of FIG. 2, showing both the positioning of the lateral brace and bushing placement.

Figure 4:
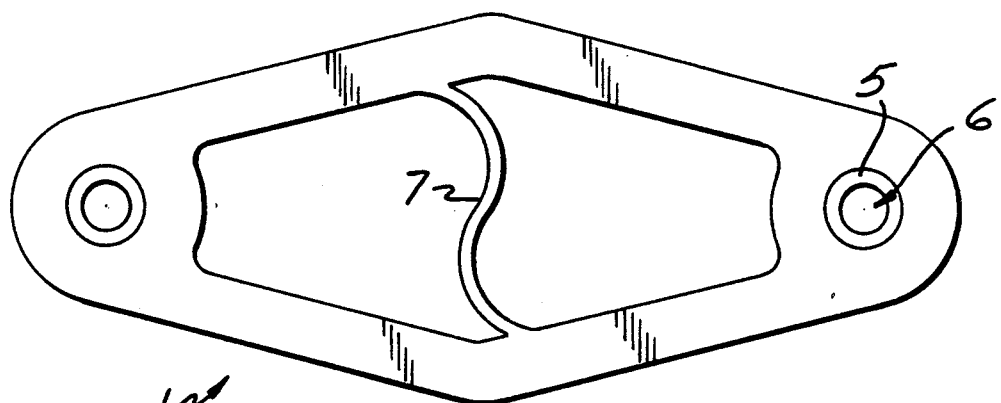
FIG. 4 is a side view of an alternative embodiment of FIG. 2 with a non-linear S-shaped lateral brace.
Figure 5:
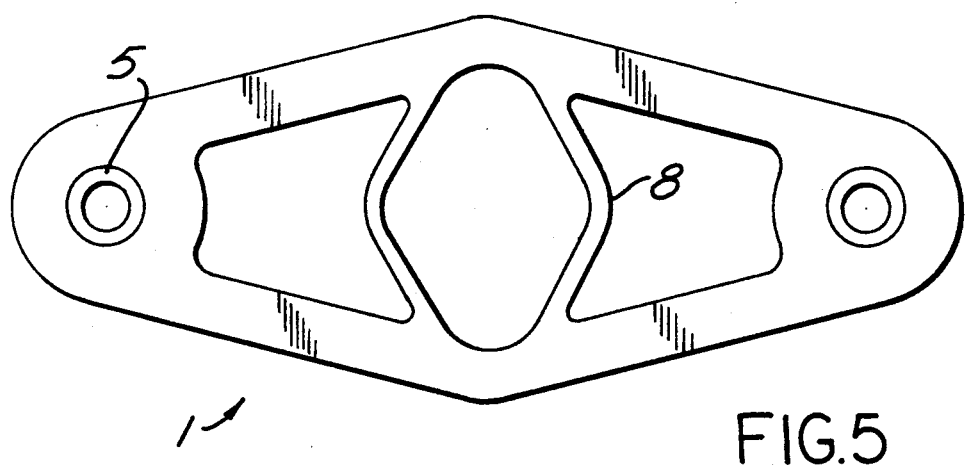
FIG. 5 is another alternative embodiment of FIG. 2 with a pair of non-linear mirror image lateral braces with lateral bends.
Figure 6:
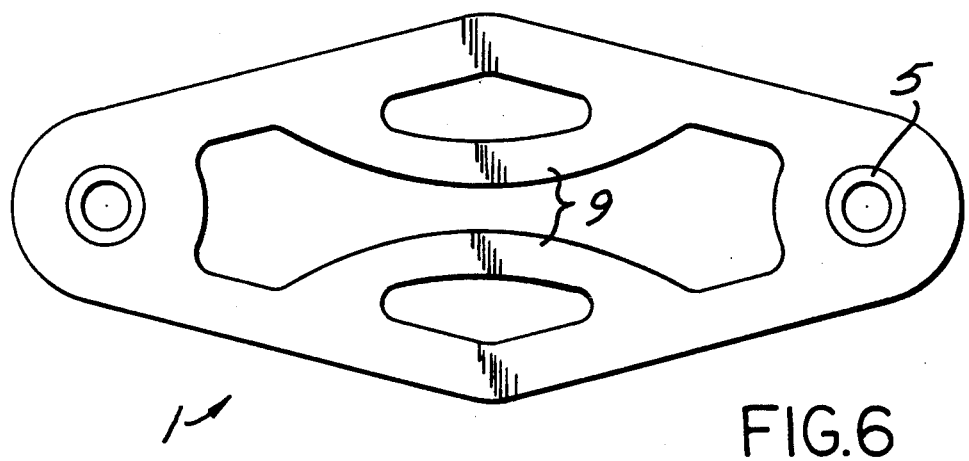
FIG. 6 is another alternative embodiment of FIG. 2 with a pair of non-linear mirror image braces extending in a longitudinal arc.

In accordance with other embodiments of this invention, FIGS. 4–6 show alternative configurations of single and paired braces spanning the open center formed by the parallelogram geometry of the strut assembly. FIG. 4 shows a lateral strut of non-linear construction with an S-shaped geometry 7. FIG. 5 shows a pair of lateral non-linear mirror image braces with lateral bends 8. FIG. 6 shows a pair of arcuate longitudinally extending mirror image braces 9.

Suitable materials for the strut of the present invention include polyethylene (preferred), a mixture of polypropylene and butyl rubber (such as Santoprene by Monsanto), a mixture of polypropylene and synthetic rubber (such as Geolast by Monsanto), polycarbonate (such as Lexan by Dupont), and polyetherester (such as Hytrel by Dupont or Arnitel by Akzo). Generally, the material should have a high modulus of elasticity, yet not be brittle. In a wide range $E = 1.0 \times 10^5 - 5.0 \times 10^6$ Lb/in$^2$, and preferably $E = 9.0 \times 10^5 - 1.5 \times 10^6$ Lb/in$^2$. The strut material may be filled with suitable materials for reinforcement, rigidity and enforced vibration dampening, such as glass or carbon fibers, or a mineral reinforced nylon.

The foregoing descriptions of embodiments of the invention have been presented for illustration and description. Although descriptive, they are not intended to be exhaustive or limiting as to the form disclosed. Modifications and variations of the generally parallelogram shaped body to cover generally closed loop members having open centers, as well as the non-linear arcuate and even straight braces are possible in light of the teachings noted above. The embodiments described above were selected to best illustrate the principles of the invention and its application.

We claim:

1. A resilient strut assembly for rigidly securing an engine to a vehicle frame to restrict engine torque induced motion, isolate engine and drive line vibration, and dampen engine torque reactions comprised of any one or more of pitch, yaw, and roll as characteristic of engine orientation, and comprising:

a body of vigorous synthetic material composition having a high modulus of elasticity, said body having a closed geometric periphery with an open center extending completely therethrough and at least one non-linear integral and elongate brace having a first and second end, and extending through said open center, so as to partition at least a portion of said open center, said first and second ends being integral with said periphery of said body, the remainder of said brace exclusive of said first and second ends being disposed within said open center and in dissociated relationship with said periphery, said body having opposed ends for fastening to the engine and frame, respectively, and means for fastening opposed ends of said body to the engine and frame respectively in such a way that forces exerted on said body are primarily in a direction between said fastening means, said at least one brace providing for dampening of small displacement high frequency vibrations by said body, while restricting large displacement low frequency structural deformations of said body.

2. The resilient strut assembly of claim 1 wherein the brace extends transverse to the axis between the fastening means.

3. The resilient strut assembly of claim 1 wherein a pair of integral braces extend through the open center.

4. The resilient strut assembly of claim 1 wherein pairs of integral braces forming a mirror image extend through the open center.

5. The resilient strut assembly of claim 4 wherein integral braces extend longitudinally of the axis between the fastening means.

6. The resilient strut assembly of claim 4 wherein integral braces extend arcuately.

7. The resilient strut assembly of claim 1 wherein the integral brace is S-shaped.

8. The resilient strut assembly of claim 1 wherein the integral brace forms a lateral bend extending through the open center.

9. The resilient strut assembly of claim 1 wherein the integral brace extends along longitudinal arches through the open center.

10. The resilient strut assembly of claim 1 wherein the closed loop is a parallelogram.

11. The resilient strut assembly of claim 10 wherein the brace extends between adjacent sides generally parallel to the axis between ends.

12. The resilient strut assembly of claim 10 wherein the brace extends between non-adjacent sides and transverse to the axis between ends.

13. The resilient strut assembly of claim 10 wherein the brace extends between adjacent sides and transverse to the axis between ends.

14. The resilient strut assembly of claim 1 wherein the vigorous synthetic material composition has a high modulus of elasticity (E) between $0.1 \times 10^6$ and $5.0 \times 10^6$ Lb/In$^2$.

15. The resilient strut assembly of claim 1 wherein the body is constructed from one piece, being fastened at opposed ends with separate fasteners.

* * * * *